March 31, 1931. E. H. TURCOTTE 1,798,343
MULCHING MACHINE
Filed Oct. 5, 1927 2 Sheets-Sheet 1

E. H. Turcotte INVENTOR
BY
ATTORNEY

WITNESS:

March 31, 1931. E. H. TURCOTTE 1,798,343
MULCHING MACHINE
Filed Oct. 5, 1927  2 Sheets-Sheet 2
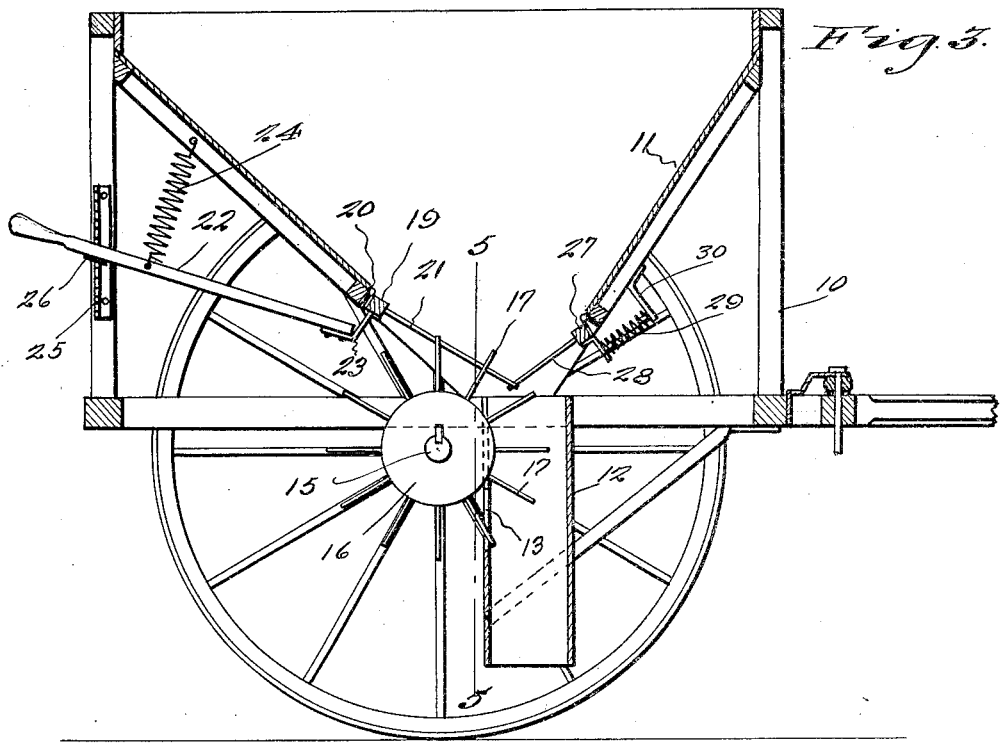
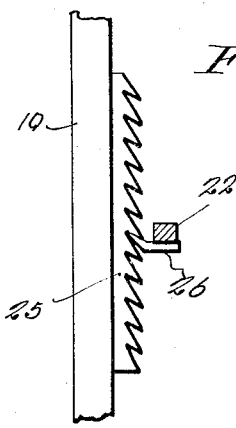
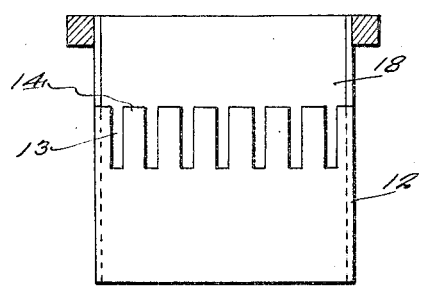

Patented Mar. 31, 1931

1,798,343

UNITED STATES PATENT OFFICE

EDWARD HARIES TURCOTTE, OF BATON ROUGE, LOUISIANA

MULCHING MACHINE

Application filed October 5, 1927. Serial No. 224,226.

The present invention relates to mulching machines and contemplates a novel construction and arrangement of parts whereby the straw can be properly distributed over the plants, and the work accomplished in much quicker order than by hand.

In carrying out the invention I contemplate a wheeled frame including a hopper, from which the straw is distributed over the plants, with a novel construction of means for regulating the amount of straw discharged from the hopper while the machine is in progress.

Another object of the invention resides in the provision of means for preventing sticks or other obstacles from interfering with the operation of the machine, should such sticks find their way into the hopper.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 3 is a sectional view on line 3—3 of Figure 2.

Figure 4 is a detail view of the rack bar.

Figure 5 is a sectional view on line 5—5 of Figure 3.

Figure 1:
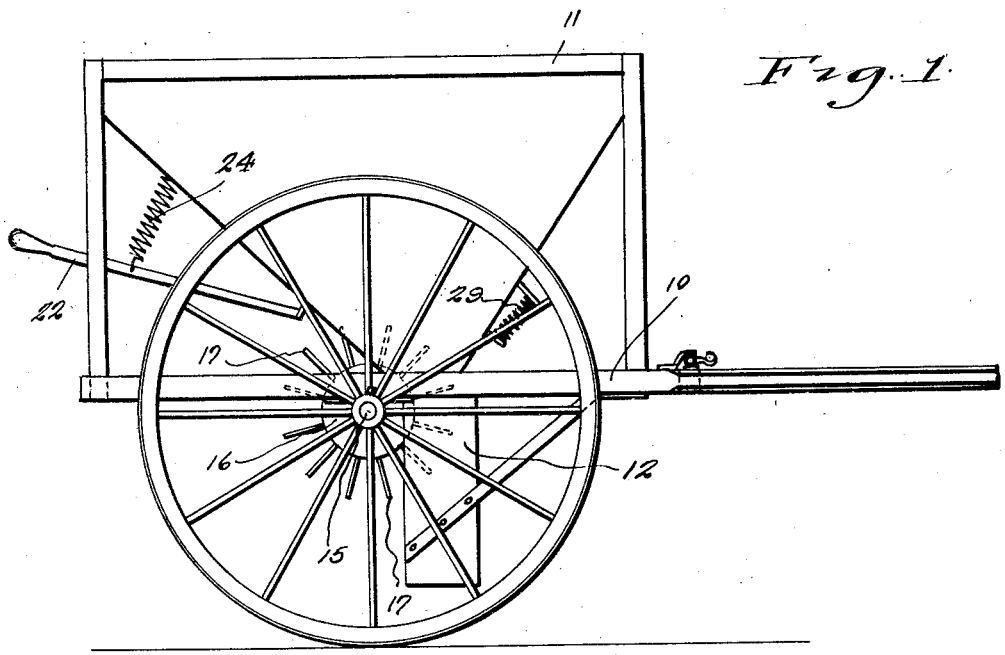
Figure 1 is a side elevation of the machine.
Figure 2:
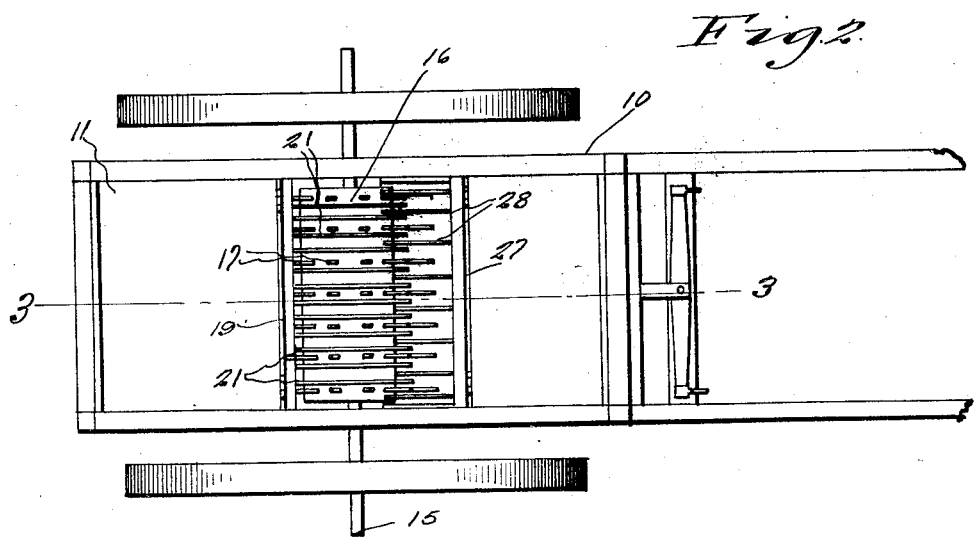
Figure 2 is a top plan view.

The machine forming the subject matter of the present invention embodies a wheeled frame indicated generally at 10 and which supports a hopper 11 from which the straw is distributed over the plants while the machine is in motion. Supported by the frame 10 and directly beneath the outlet end of the hopper 11 is a chute 12 which terminates in close proximity to the ground. This chute is provided at one side with a plurality of vertically disposed slots 13 and fingers 14 alternately arranged as illustrated in Figure 5 and used in a manner to be presently described.

Carried by the axle 15 of the machine is a drum 16 carrying spaced circumferential series of rods 17 for feeding the straw from the hopper 11 into the chute 12. These fingers pass through the slots 13 of the chute to force the straw through the latter onto the ground, the slots being of a width sufficient to allow the rods to pass therethrough, while the fingers 14 are used to prevent the straw from clinging on the rods as the latter pass from within the chute 12. As shown in Figure 3 the drum is arranged directly at one side of the chute 12, the upper portion of which is cut away as at 18 to allow the drum to partly project within the chute, the drum rotating with the axle 15 when the machine is in motion.

For the purpose of regulating the amount of straw admitted to the chute, so that the straw will be more or less uniformly distributed over the plants, I employ a small rake-like structure, the frame of which is indicated at 19 and hingedly mounted on the hopper as at 20. The tines 21 of the rake extend across the discharge opening of the hopper and are arranged to permit the rods 17 to operate therebetween. However, by adjusting the rake 19 vertically, the rods 17 are allowed to project a more or less distance within the hopper so as to engage a greater or less quantity of straw during the rotation of the drum as will be readily understood. For the purpose of adjusting the rake 13 with this object in view, I provide a lever 22 which is secured to the frame by a suitable bracket 23. A spring 24 is connected with the lever and also with the hopper and normally exerts an upward pressure upon the lever. The lever operates across a rack bar 25 and is provided with a blade 26 arranged to engage the teeth of the rack bar to hold the lever and rake 21 in a given position.

Hingedly mounted on the other side of the hopper is a small rake 27, the tines of which are indicated at 28 and terminate adjacent the tines 21 and the rake 19. The rake 27 is mounted for yielding movement against the tension of the spring 29 suitably supported by brackets 30. The purpose of the rake 27 is to permit sticks or other objects to pass through the hopper without interfering or injuring the mechanism above described, the obstacles striking the rake 27, and when engaged by the rods 17 of the drum, the rake will yield to allow the sticks or other objects to pass from the hopper to the chute 12.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

In a machine of the character described, a hopper, an inclined rake pivotally mounted on one wall of the hopper and including spaced parallel tines extended partly across the discharge opening of the hopper, a relatively small auxiliary rake pivotally mounted upon the opposed wall of the hopper, and including spaced parallel tines normally arranged between the tines of the first mentioned rake and inclined in a direction opposite to the inclination of the first mentioned tines, means for yieldably supporting the second mentioned rake, means for dispensing material from the hopper from between the tines of said rakes, and means including a manually operable lever for vertically adjusting the first mentioned rake with relation to the dispensing means, and thereby regulate the amount of material dispensed from the hopper.

In testimony whereof I affix my signature.

ED. HARIES TURCOTTE.